Aug. 16, 1949.  M. P. LAURENT  2,479,124
GATE VALVE
Filed Nov. 3, 1947  2 Sheets-Sheet 2

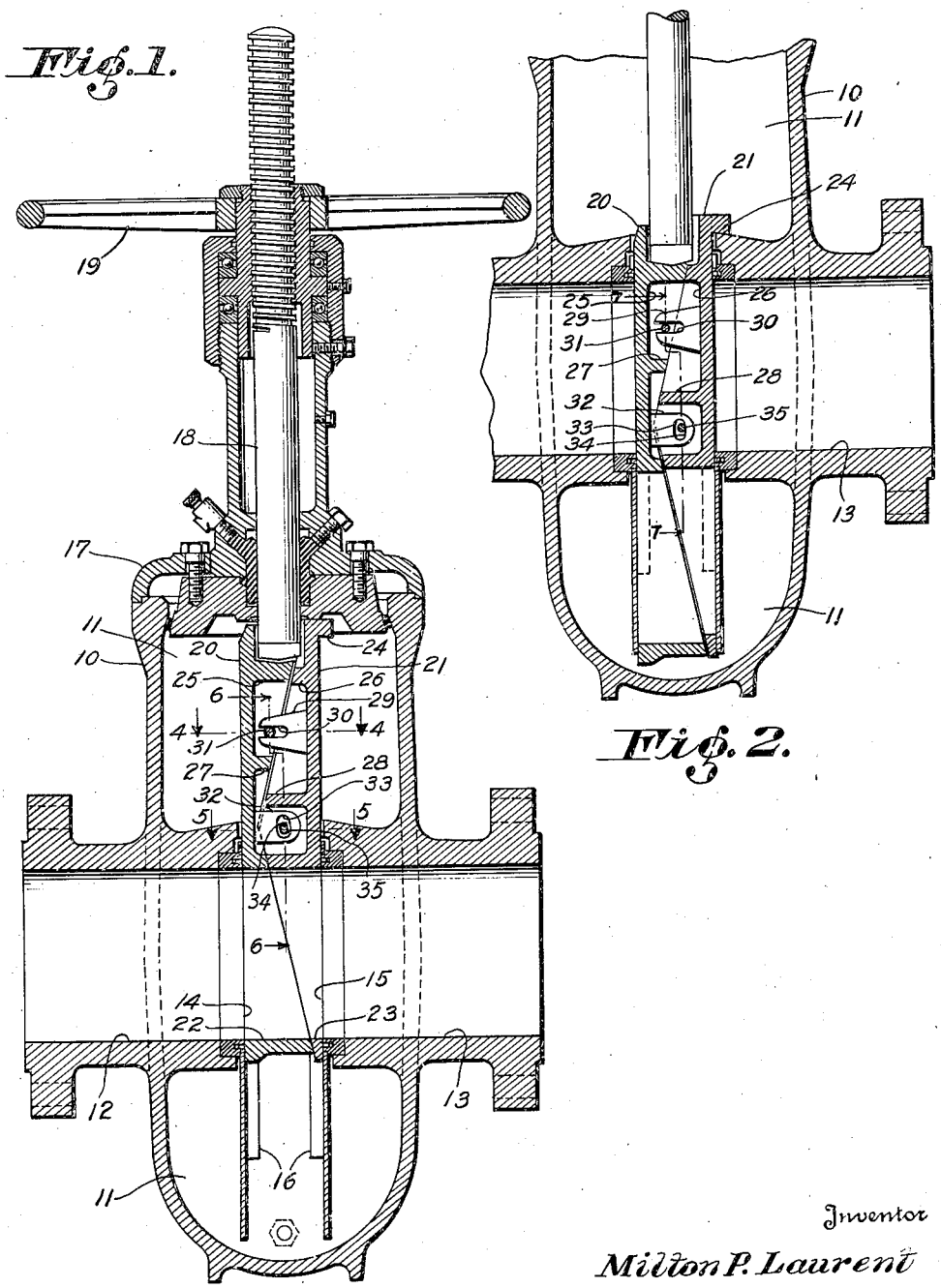

Inventor
Milton P. Laurent
By
Attorney.

Patented Aug. 16, 1949

2,479,124

UNITED STATES PATENT OFFICE 2,479,124

GATE VALVE

Milton Paul Laurent, Houston, Tex.

Application November 3, 1947, Serial No. 783,735

14 Claims. (Cl. 251—68)

This invention relates to improvements in "through conduit" sliding gate valves, especially those designed to control the flow in conduits carrying fluids such as gas or oil, which latter may be under rather high pressure. A "through conduit" gate valve is one which, with the gate in open position, leaves the conduit entirely unobstructed to flow at the valve opening. More particularly, the improvement pertains to a gate mechanism for such valves which has double-taper gate elements, as shown, for example, in the United States patent to M. P. Laurent, Reissue No. 20,101, dated September 8, 1936. In such a valve, the ported gate mechanism comprises two double-tapered sections having opposed, contacting inner faces which diverge outwardly from a central waist portion to provide two sets of wedging surfaces. Because of this construction, when one section is at the end of its opening or its closing movement, the other section is shifted relatively from a centered position, along the line of travel of the gate mechanism, to effect a wedging action between the sections to expand the gate and force the outer sealing faces of the sections against the valve seats. The many advantages of this type of valve are well known and need not be enumerated here.

In order that the gate mechanism may be moved freely and easily between full open and full closed positions of the valve, it is desirable to contract or collapse the gate mechanism to its minimum overall transverse dimension, when the expanding force is relieved. In this contracted condition, with both sets of wedging surfaces of the gate sections in contact, the gate mechanism can be moved without undue friction or binding thereof against the valve seats. In order to contract the gate mechanism the two sections which comprise the gate must be centered, that is, the apexes of the inner diverging faces brought into transverse alignment. In addition to being centered, the gate sections must be forced together, in order to contract the gate mechanism to its minimum overall transverse dimension, when the sections are centered. Thus, it will be seen that two forces are necessary to contract the mechanism; a centering force which acts in the direction of the line of travel of the gate mechanism to shift the two sections relatively from a wedged condition, and another force acting transversely of the sections to force them together. This latter force may be termed a collapsing force. In practice, it is found desirable for the two sections to slide into contracted condition since if the sections parted along both sets of wedging surfaces, a pressure lock might develop in the valve. The conditions under which a pressure lock could develop exist when the pressure in the valve housing is greater than the line pressure on both sides of the valve. Such a condition occurs when the valve is moved to closed position with high pressure in the line and the high pressure is subsequently relieved before the valve is opened. But two forces, or at least two components of a single force, are necessary to completely contract the gate mechanism.

These two forces are provided, in some measure, although inadequately, in the structure shown in the aforementioned Laurent patent by spring clips mounted exteriorly on the lateral sides of the gate mechanism. While a positive collapsing force, which also serves to maintain the assembly, is provided by the clips, the necessary centering force is very limited, principally because of excessive friction losses between the clip and a lug on one of the sections which the clip engages adjacent its mid point. Furthermore, experience with the external clips, as shown in the noted Laurent patent, has proved that breaking of these clips not infrequently occurs when there is sticking against the seat of the section that must be moved by the force that is transmitted to that section through the spring clip connection.

I have now discovered that if each of the two required forces for contracting the gate sections is provided by a separate spring, the principal function of each spring being to produce one of the required forces, complete contraction of the gate sections is secured with certainty of operation, and the frequent breakage of springs, as was found to result from use of dual function springs, is avoided.

Accordingly, it is an object of this invention to provide a valve gate mechanism of the type described with more effective means for completely contracting the gate sections.

It is another object of this invention to provide separate means, each acting independently, for centering and collapsing a valve gate mechanism.

Still another object of the invention is to provide spring means for more effectively centering and collapsing the valve gate sections with less danger of breaking the springs under any and all operating conditions of the valve.

A further object of the invention is to provide a more compact and economical valve gate assembly.

Other objects and advantages of the invention will be apparent from the following specification and accompanying drawings in which:

Figure 1 is a transverse vertical sectional view through a gate valve embodying this invention, showing the valve in open position and with the gate sections expanded into sealing engagement with the valve seats.

Figure 2 is a fragmentary view corresponding to Figure 1 showing the valve in closed expanded position.

Figure 3:
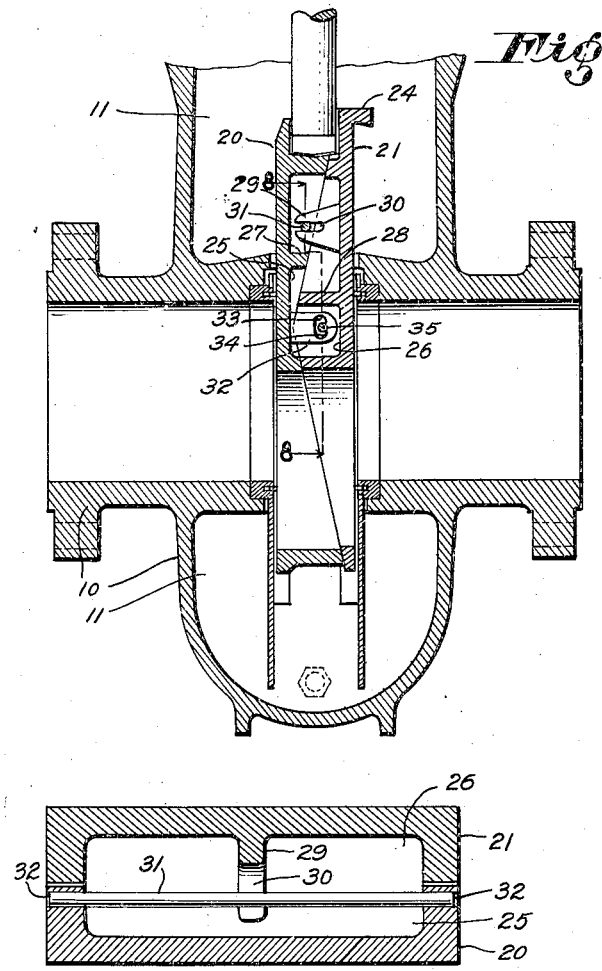
Figure 3 is a fragmentary view corresponding to Figure 1 showing the valve intermediate between open and closed positions, with the gate sections contracted.

Referring to the drawings, Figure 1 shows a through conduit gate valve, of the rising stem type, having a housing 10 provided with an interior chamber 11 in which is housed the gate mechanism of the valve. Aligned ports 12 and 13 formed in opposite walls of the housing 10 are provided with parallel (preferably removable) valve seats, 14 and 15. These seats have lateral side flanges 16 which together with the seats serve to guide and confine the gate mechanism to substantially rectilinear movement. The upper portion of the housing 10 is of known construction having a bonnet 17 through which extends the valve operating stem 18. The stem 18 is threadedly engaged with a conventional handwheel 19, rotation of which raises and lowers the stem to thereby open and close the valve.

The ported valve gate mechanism, which slides in the guides, is formed of two double-tapered, relatively displaceable sections, one herein termed the gate 20 and the other the segment 21. Both sections have ports 22 and 23 which in the open position of the gate mechanism, as shown in Figure 1, are aligned with the ports 12 and 13 in the housing to permit unobstructed passage of fluid through the valve. The upper end of the gate 20 is detachably secured to the valve stem 18, preferably by means of a slot and T-head connection. Vertical, non-rotary movement of the stem by means of the handwheel raises and lowers the gate 20 and segment 21, as a unit.

Figure 4:
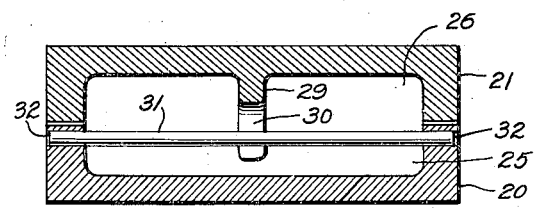
Figure 4 is a horizontal sectional view of the valve gate mechanism taken on line 4—4 of Figure 1.
Figure 5:
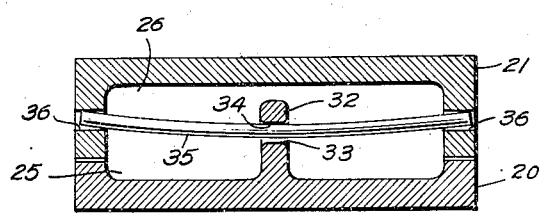
Figure 5 is a horizontal sectional view of the valve gate mechanism taken on line 5—5 of Figure 1.

The gate and segment, when assembled, are substantially rectangular in horizontal section, as shown in Figures 4 and 5, so that their flat outer faces sealingly engage the corresponding flat-faced valve seats 14 and 15. It is obvious, however, that the sealing faces of the gate sections and corresponding faces of the valve seats may be arcuate or other suitable shape, in horizontal section.

The inner opposed faces of the gate 20 and segment 21 diverge outwardly in the same directions from a central waist portion to provide two sets of wedging surfaces. Accordingly, with relative endwise displacement of the gate and segment from a centered position (shown in Figure 3), in either direction along the line of travel of the mechanism, there results a mutual wedging action between the inner contacting surfaces that is effective to expand the gate and segment sufficiently to force the outer sealing faces thereof into tight sealing engagement with their respective valve seats. Relative movement is imparted to the gate and segment adjacent both ends of travel of the gate mechanism by a lug or projection 24 on one end of the segment 21 which, upon contact with a fixed abutment, stops the movement thereof, as shown in Figures 1 and 2, just before the gate 20, impelled by the valve stem 18, reaches its final limit of travel. Hence, the gate and segment, by relative endwise displacement, are expanded into tight sealing engagement with their respective valve seats, in both open and closed positions of the valve.

In order to contract the gate mechanism so that it may be moved freely and easily between open and closed positions, separate, positive acting means are provided both to center and to collapse the gate and segment, when the gate mechanism is relieved of the expanding force. The centering and the collapsing means are located in the chamber defined by the walls of opposed recesses 25 and 26 formed, respectively, in the inner opposed faces of the gate and segment. Laterally extending ribs 27 and 28 reinforce the gate and segment, respectively, in the cored-out recesses 25 and 26.

Figure 6:
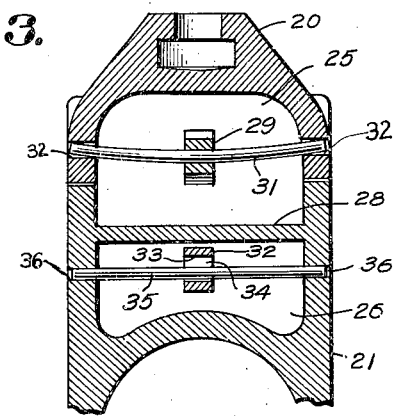
Figure 6 is a sectional view of the valve gate mechanism taken on line 6—6 of Figure 1.
Figure 7:
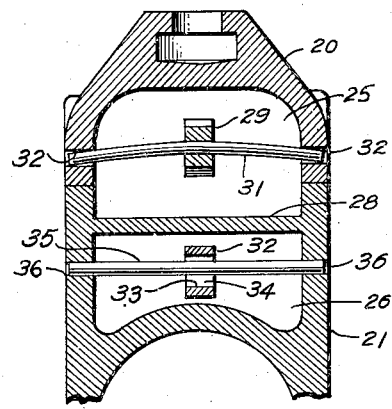
Figure 7 is a sectional view of the valve gate mechanism taken on line 7—7 of Figure 2.
Figure 8:
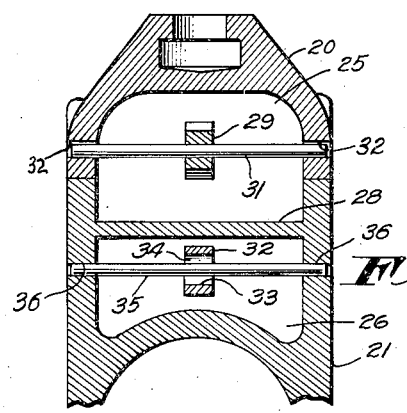
Figure 8 is a sectional view of the valve gate mechanism taken on line 8—8 of Figure 3.

A transverse lug 29 projects from the segment 21 and overlaps the side walls of the recess 25 formed in the gate 20. The lug 29 is provided with an elongated opening or slot 30 having substantially parallel sides extending transversely of the gate mechanism and substantially normal to the line of travel thereof. The opposite ends of a laterally extending spring bar or rod 31 are mounted in correspondingly shaped openings or bores 32 in the side walls of the recess 25 in the gate with the central portion of the bar passing through the elongated slot 30 in the lug 29. The bar 31 preferably is round in transverse section as shown, although other symmetrical sectional shapes may be suitable. The diameter or width of the bar 31 is such that it has sliding engagement with both sides of the slot 30. The bores 32 are so laterally aligned with the slot 30 that when the gate and the segment are in centered position, the bar 31 is straight, as shown in Figure 8, and exerts no appreciable force which tends to center the gate and segment. When the gate and the segment are shifted relative to each other from a centered position, however, in either direction of the line of travel of the gate mechanism, the bar 31 is flexed or bowed, as shown in Figures 6 and 7; and, being of spring material (preferably spring steel), the bar exerts a positive force to urge the gate and segment back into centered position. Since the slot 30 is elongated transversely of the gate mechanism, the bar 31 exerts no transverse or collapsing force on the gate and the segment when these two are wedged apart, but acts only to center the two sections, and to resist any force which tends to displace the sections by relative endwise movement.

The means to collapse the gate mechanism and maintain the two sections with their inner faces in contact, also is mounted in the chamber formed by the recesses 25 and 26. A transverse lug 32 projects from the gate 20 and overlaps the side walls of the recess 26 formed in the segment 21. The lug 32 is provided with an elongated opening or slot 33 having one side 34 thereof extending in the line of travel of the gate mechanism parallel to and facing in the same direction as the outer sealing face of the gate. The opposite ends of a laterally extending spring bar or rod 35 are mounted in correspondingly shaped openings or bores 36 in the side walls of the recess 26 in the segment, with the central portion of the bar passing through and engaging the side 34 of the slot 33 in the lug 32. The bar 35 preferably is round in cross-section, as shown, and in diameter is somewhat less than the width of the elongated slot 33, so that the bar engages only the side 34 of this slot. The bores 36 and the slot 33 are offset transversely of the gate mechanism so that even when the gate and the segment are in fully contracted position with both sets of their inner wedging surfaces in contact, the bar 35 is flexed and therefore exerts an initial positive force that is effective to collapse the two sections, as best shown in Figure 5. Since the slot 33 is elongated in the direction of travel of the mechanism, the bar 35 exerts no force on the gate and the segment to prevent their relative endwise displacement. The effective force of the bar 35, in addition to collapsing the gate and segment, serves also to maintain their assembly in the manufacturing process. Relative shifting between the gate and segment, which acts to expand the gate mechanism, increases the collapsing force exerted by the bar 35, but such increase is small and only slightly adds to the initial loading or bowing of the spring bar.

The assembly of the gate mechanism into a unit easily may be effected by centering and collapsing the two sections thereof and then driving or pressing the spring bars 31 and 35 into their respective bores 32 and 36.

In the embodiment of the invention thus far shown and described, the two springs 31 and 35 have entirely independent functions. While complete independent function of the springs 31 and 35 has obvious advantages, already described, the type of springs used and their location, with reference to the gate and segment, as herein disclosed, makes it possible, with only slight structural changes, to provide for cooperation between the two springs so that both of them (or either one in event of breakage of the other one) are effective to resist relative movement between the gate and segment whether the force to be resisted is that which produces endwise displacement or transverse separation of the gate and segment. This result may be accomplished by forming the openings 30 and 33 not as elongated slots, but as openings in the lugs 29 and 32, respectively, which surround and conform to the periphery of the spring bars 31 and 35, respectively. The bores 32 for spring 31 then should be offset from the opening 30, similarly to the offset between the bores 36 and the opening 33, so that the spring 31 also will be flexed initially but oppositely to the initial flexing of the spring 35. With this slightly modified construction, both springs exert a collapsing force and also resist relative endwise displacement of the gate and segment, from a centered position. Thus, the single force provided by each spring has two effective components, a centering force and a collapsing force. Although this modified construction is disclosed as embodying two springs, a single spring may be employed, preferably the spring 35 which is nearer the apexes of the inner diverging faces of the gate and segment.

It will be seen that a compact unitary valve gate assembly has been provided by this invention. Spring safety factor against breakage has been increased substantially. Positive true spring forces, that is, acting normally to the surfaces engaged instead of at an angle thereto, have been provided with consequent increase in effectiveness of operation. The assembly is simple in construction and accordingly more economical to manufacture.

Modifications of the specific embodiment of the invention which has been described readily will be apparent to those skilled in the art. Accordingly, the invention encompasses all modifications which come within the spirit and scope of the following claims.

I claim:

1. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction; means for effecting endwise relative shifting of said members adjacent both ends of travel thereof; and bar-like resilient means extending laterally through said members interiorly thereof, and normal to the direction of their travel, said means connecting both said members for yielding opposition to relative movement from a contracted position wherein the apexes of said inner diverging faces are aligned and both said sets of wedging surfaces are in contact.

2. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction; means carried by one of said members for effecting endwise relative shifting of said members adjacent both ends of travel thereof; a resilient bar extending laterally through said members, interiorly thereof, and normal to the direction of their travel, said bar connecting both said members for yielding opposition to relative endwise shifting from a centered position wherein the apexes of said inner diverging faces are aligned; and a second resilient bar extending laterally through said members, interiorly thereof, and normal to the direction of their travel, said second bar connecting both said members for yielding opposition to relative transverse displacement from a contracted position wherein both said sets of wedging surfaces are in contact.

3. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction; means carried by one of said members for effecting endwise relative shifting of said members adjacent both ends of travel thereof; and two resilient bars extending laterally through and between said members and connecting both said members to yieldingly oppose relative displacement thereof from a contracted position wherein the apexes of said inner diverging faces are aligned and both said sets of wedging surfaces are in contact, the connection between one of said bars and said members being such that said one bar may exert only endwise forces on said members and the connection between the other of said bars and said members being such that said other bar may exert only transverse forces on said members.

4. The structure defined in claim 3 in which said other bar is initially stressed to exert transverse forces on said members when said members are in contracted position.

5. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction; means carried by one of said members for effecting endwise relative shifting of said members adjacent both ends of travel thereof; and at least one resilient bar extending laterally through said members, interiorly thereof, and normal to the direction of their travel, said bar connecting both said members for yielding opposition to relative movement from a contracted position wherein the apexes of said inner diverging faces are aligned and both said sets of wedging surfaces are in contact.

6. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction of movement; means for effecting endwise shifting of said members adjacent both ends of travel thereof; a resilient bar extending normal to the line of travel of said members and having the opposite ends thereof connected to one of said members; and means defining opposed surfaces on the other of said members engaging opposite sides of said bar, intermediate the ends thereof, said surfaces being substantially normal to the line of travel of said members, whereby relative endwise shifting between said members, from a centered position wherein the apexes of said inner diverging faces are aligned, flexes said bar to cause it to exert recentering forces on said members.

7. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction; means for effecting endwise shifting of said members adjacent both ends of travel thereof; a laterally extending resilient bar having the opposite ends thereof connected to one of said members; and means defining a surface on the other of said members engaging a side of said bar intermediate the ends thereof, said surface being substantially parallel to and facing in the same direction as the sealing face of said other member, whereby relative transverse displacement of said members from a contracted position, wherein both said sets of wedging surfaces are in contact, flexes said bar to cause it to exert transverse retracting forces on said members.

8. The structure defined by claim 7, in which the resilient bar is stressed to cause it to exert initial transverse retracting forces on said members when both said sets of inner wedging surfaces are in contact.

9. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction; means for effecting endwise relative shifting of said members adjacent both ends of travel thereof; and at least one laterally extending resilient bar having the opposite ends thereof connected to one of said members and an intermediate portion thereof connected to the other of said members, whereby relative movement between said members from a contracted position, wherein the apexes of said inner diverging faces are aligned and both said sets of wedging surfaces are in contact, flexes said bar to cause it to exert recontracting forces on said members.

10. The structure defined by claim 9, in which the resilient bar is stressed to exert initial transverse retracting forces on said members when both said sets of inner wedging surfaces are in contact.

11. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction of movement; means for effecting endwise shifting of said members adjacent both ends of travel thereof; a first laterally extending resilient bar having the opposite ends thereof connected to one of said members; means defining opposed surfaces on the other of said members engaging said bar intermediate the ends thereof, said surfaces being substantially normal to the line of travel of the gate, whereby relative endwise shifting between said members from a centered position, wherein the apexes of said inner diverging faces are aligned, flexes said bar to cause it to exert recentering forces on said members; a second laterally extending resilient bar having the opposite ends thereof connected to one of said members; and means defining a surface on the other of said members engaging a side of said second bar intermediate the ends thereof, said surface being substantially parallel to and facing in the same direction as the sealing face of said other member, whereby relative transverse displacement of said members from a contracted position, wherein both said sets of wedging surfaces are in contact, flexes said second bar to cause it to exert transverse retracting forces on said members.

12. The structure defined in claim 11, in which the second resilient bar is stressed to exert initial transverse retracting forces on said members when both said sets of inner wedging surfaces are in contact.

13. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction; means for effecting endwise relative shifting of said members adjacent both ends of travel thereof; and laterally-extending bar-like resilient means disposed normal to the direction of travel of the gate and connecting both said members for yielding opposition to relative movement from a contracted position wherein the apexes of said inner diverging faces are aligned and both said sets of wedging surfaces are in contact.

14. In a gate valve having a housing provided with aligned ports, parallel valve seats, and a gate slideable between the seats, said gate comprising: two abutting members having outer parallel sealing faces to engage the valve seats and inner opposed faces which diverge outwardly from the central waist portions of said members to provide two sets of wedging surfaces effective to force said members oppositely into sealing engagement with the valve seats when said members are shifted endwise relatively to each other in either direction; means for effecting endwise relative shifting of said members adjacent both ends of travel thereof; means defining a chamber between said members interiorly thereof; bar-like resilient means extending between and connected to the lateral walls of said chamber; and lug means secured to at least one wall of said chamber and engaging said resilient means between the ends thereof for yieldingly opposing relative movement of said members from a contracted position wherein the apexes of said inner diverging faces are aligned and both said seats of wedging surfaces are in contact.

MILTON P. LAURENT.

REFERENCES CITED

The following references are of record in the file of this patent:

UNITED STATES PATENTS

| Number | Name | Date |
| --- | --- | --- |
| Re. 20,101 | Laurent | Sept. 8, 1936 |